United States Patent [19]

Seragnoli et al.

[11] Patent Number: 4,565,284

[45] Date of Patent: Jan. 21, 1986

[54] APPARATUS FOR TRANSFERRING INDIVIDUAL OR BATCH FORMED PRODUCTS FROM A FIRST TO A SECOND MACHINE

[75] Inventors: Enzo Seragnoli; Gastone Dall'Osso, both of Bologna, Italy

[73] Assignee: G.D. Societa per Azioni, Bologna, Italy

[21] Appl. No.: 475,743

[22] Filed: Mar. 16, 1983

[30] Foreign Application Priority Data

Apr. 13, 1982 [IT] Italy ................................ 3396 A/82

[51] Int. Cl.[4] ............................................. B65G 23/00
[52] U.S. Cl. ...................................... 198/792; 198/812
[58] Field of Search ................ 198/460, 812, 594, 792

[56] References Cited

U.S. PATENT DOCUMENTS

| | | | |
|---|---|---|---|
| 2,932,376 | 4/1960 | Millington | 198/594 |
| 3,448,846 | 6/1969 | Bardenhagen | 198/792 |
| 3,506,105 | 4/1970 | Stauber | 198/812 |
| 4,231,470 | 11/1980 | Parkes | 198/812 |
| 4,413,724 | 11/1983 | Fellner | 198/594 |

FOREIGN PATENT DOCUMENTS

| | | |
|---|---|---|
| 1213490 | 11/1970 | United Kingdom . |
| 1301843 | 1/1973 | United Kingdom . |
| 1497221 | 1/1978 | United Kingdom . |
| 1531622 | 11/1978 | United Kingdom . |

Primary Examiner—Joseph E. Valenza
Assistant Examiner—Kyle E. Shane
Attorney, Agent, or Firm—Cushman, Darby & Cushman

[57] ABSTRACT

Disclosed herein is an apparatus comprising at least one transportation line that connects the exit point of a first machine with the entry point of a second machine, and the exit point of the second machine with the entry point of the first machine, the drive being provided by the said machines either directly or through means connected thereto.

The transportation line is so constructed that if the first machine should slow down or come temporarily to a halt, a gradual decrease occurs in the length of the section that runs, filled with products, from the first to the second machine and, contemporaneously, the length of the section of the said line that runs, devoid of products, from the second to the first machine, increases. Should, instead, the second machine slow down or come temporarily to a halt, a gradual decrease occurs in the length of the section that runs, devoid of products, from the second to the first machine and, contemporaneously, the length of the section that runs, filled with products, from the first to the second machine, increases.

4 Claims, 4 Drawing Figures

APPARATUS FOR TRANSFERRING INDIVIDUAL OR BATCH FORMED PRODUCTS FROM A FIRST TO A SECOND MACHINE

BACKGROUND OF THE INVENTION

The invention relates to an apparatus for transferring individual or batch formed products, or else minute products grouped together numerically or by weight, from a first machine, for example a machine for forming and delivering the said products, to a second machine that attends, by way of an example, to the packing of the said products.

DESCRIPTION OF THE PRIOR ART

One of the main problems that has to be faced when constructing plants for the production of packed products, in which a number of machines placed in line and designed to perform different operations in the production cycle, are envisaged, concerns the transfer of the products from one machine to the other and ensuring, in the event of one machine temporarily slowing down or coming to a halt, that it be possible, for a certain period of time, to prevent the other machines from coming to a halt.

This problem has been dealt with in, for example, plants for placing cigarettes in packets, wherein one or more cigarette delivering machines are generally linked up to one single packeting machine, and also in plants where the packets leaving the packeting machine are routed onto a machine that wraps them in a plastic material film.

The most commonly adopted solutions envisage there being, in between the two operating sections, storage means able to accommodate an accumulation of products outgoing from the machine upstream thereof in the event of the machine downstream slowing down or coming to a temporary halt, and to deliver the products stored to the machine downstream thereof should the machine upstream slow down or come to a temporary halt.

With the storage means adopted to date it is expected, in the event of the machine upstream halting or slowing down, that the prior accumulated products be delivered to the machine downstream, commencing with the last product stored.

Despite solutions of this nature making it possible to solve the problem outlined above, they do present an operating difficulty that can only be remedied by the machine operator. It can, in fact, happen that the first products retained in the storage means never get sent on to the machine downstream because of the fact that the storage means are never fully emptied. It thus ensues, particularly in the case of products that have to be wrapped and sealed in a short space of time, that a long stay inside the storage means can be the cause of deterioration in the characteristics of the products, and that it is consequently necessary to periodically replace the products stored with new products.

SUMMARY OF THE INVENTION

The object of the invention is to overcome the aforementioned difficulty and, in particular, to provide an apparatus for transferring individual or batch formed products from a first to a second machine, in which the storage means are formed by the self same means that transport the products, so as to supply the products to the machine downstream thereof in an orderly succession coinciding with that in which the products exit from the machine upstream.

This and other objects too are all attained with the apparatus according to the invention comprising at least one transportation line that issues from the first machine, enters the second machine and issuing from this returns back to the said first machine, the said transportation line being carried in movement by drive means connected to the said machines, and being so constructed as to have two sections of variable length, placed between the exit point of the first machine and the entry point of the second machine, and between the exit point of the second machine and the entry point of the first machine, respectively; the said sections of the transportation line being interconnected in such a way that, in the event of one of the two machines slowing down or coming to a temporary halt, an increase in the length of one section corresponds to a consequential similar decrease in the length of the other section.

BRIEF DESCRIPTION OF THE DRAWINGS

The characteristics of the apparatus forming the subject of the invention will now be better explained in the description that follows of one preferred but not sole embodiment, with reference to the accompanying drawings, in which.

DESCRIPTION OF THE PREFERRED EMBODIMENT

Figure 1:
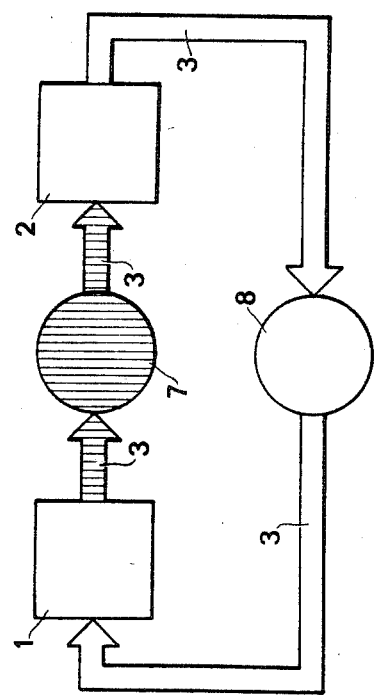
FIG. 1 shows, in a block diagram, a plant comprising two machines connected to the apparatus in question.
Figure 2:
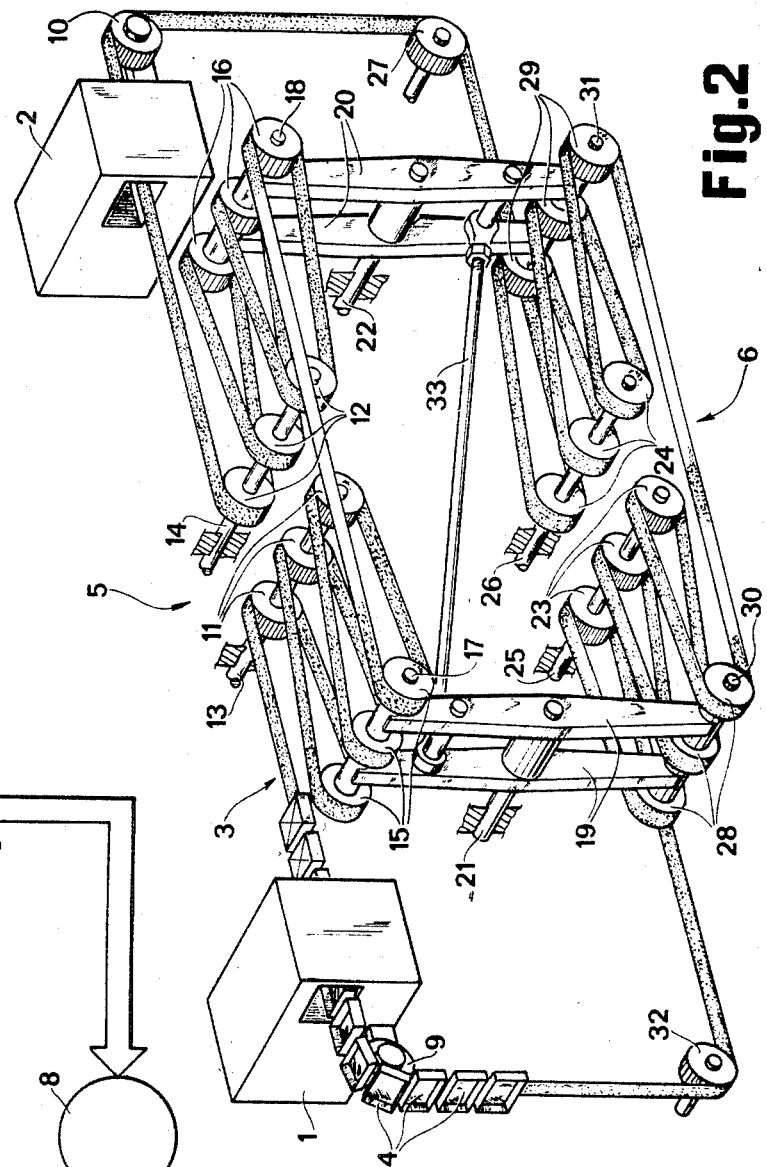
FIG. 2 shows, diagramatically in a perspective view, the apparatus in question under the normal operating conditions of the two machines.

With reference to the said figures, and in particular to FIGS. 1 and 2, at 1 has been shown the station at which products are delivered by a first (non illustrated) machine, and at 2 the station at which the said products enter a second (also non-illustrated) machine placed in line with the first machine.

So as to ease the description given hereinafter of the apparatus in question, the said stations will henceforth be referred to simply as the first machine and the second machine.

At 3 has been shown a continuous conveyor that connects, one to the other, the machines 1 and 2. The conveyor 3 can be provided, over the full length thereof, with elements 4 for containing the products delivered by the machine 1, for example cakes of soap placed one after the other. Although only a few of the elements 4 are shown, purely as an indication, in the drawings, in actual fact they are distributed uniformly over the full length of the conveyor 3.

First and second intermediate elements, shown at 5 and 6, respectively, are placed between the exit point of the first machine 1 and the entry point of the second machine 2 and between the exit point of the second machine 2 and the entry point of the first machine 1, respectively.

The conveyor 3 is mounted around the said first and second intermediate elements 5 and 6 in such a way as to form, as will be seen below, two storage areas 7 and 8 (shown only in FIG. 1), the first of which for the product filled elements 4 issuing from the first machine 1, and the second for the empty elements 4 exiting from the second machine 2.

The continuous conveyor 3 can be formed by one or more cogged belts or by one or more chains.

Figure 3:
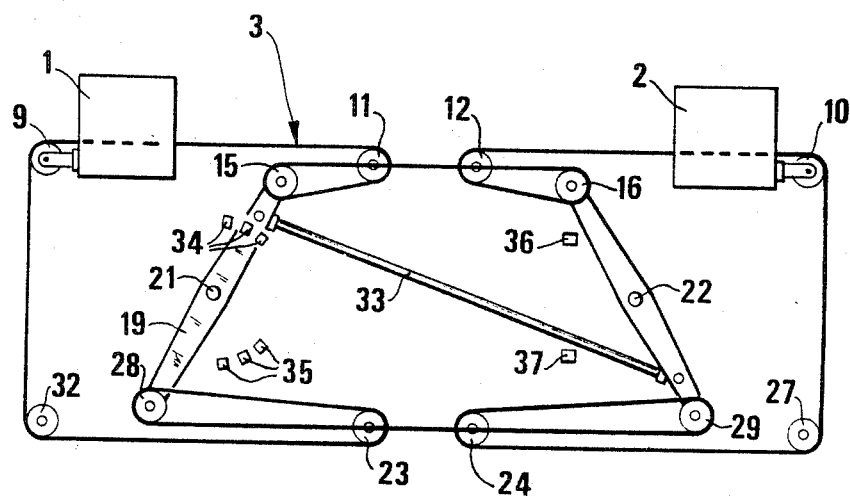
FIG. 3 shows, diagrammatically in a lateral view, the apparatus in question in the condition in which it is to be found after the first machine has slowed down or has come to a temporary halt.
Figure 4:
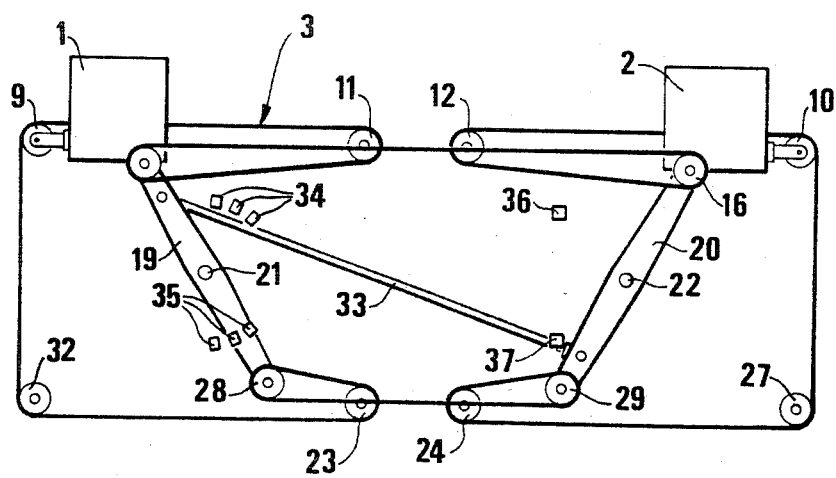
FIG. 4 shows, again diagrammatically in a lateral view, the apparatus in question in the condition in which it is to be found after the second machine has slowed down or has come to a temporary halt.

In the case described herein the conveyor 3 is formed by a cogged belt or band carried in motion by non illustrated driving devices connected to two toothed powering pulleys 9 and 10, the second of which positioned at the exit point of the second machine 2 (see FIGS. 2, 3 and 4). The said powering devices can be the same ones that provide the moving parts of the machines 1 and 2 with motion, or else devices connected thereto. Under normal operating conditions, the pulleys 9 and 10, contemporaneously and at identical speed, carry in motion the conveyor 3.

At 11 and 12 have been shown a first and a second set of three toothed pulleys that form part of the first intermediate elements 5 and are loosely mounted on a pair of spindles 13 and 14 supported by the frame of the apparatus. The spindles 13 and 14 are parallel one to the other, face one another and are placed in an intermediate area between the machines 1 and 2.

A third and a fourth set of three toothed pulleys, shown at 15 and 16, respectively, also form part of the first intermediate elements 5. The pulleys 15 and 16 are placed, staggered with respect to the pulleys 11 and 12, in a horizontal plane and are loosely mounted on a pair of spindles 17 and 18 secured to the upper extremity of two frames formed by lever or rocker arms 19 and 20, respectively, the middle part of which pivotally connected to the spindles 21 and 22 parallel to the spindles 13-14 and 17-18 and supported by the frame of the apparatus.

When the continuous conveyor 3 exits from the first machine it winds itself first of all onto the pulleys 11 and 15 and then onto the pulleys 16 and 12. Issuing from the machine 2 the conveyor 3 winds itself onto the toothed driving pulley 10 and then onto a further loosely mounted toothed pulley 27 placed at a lower level than the pulley 10, this in order to arrive at the second intermediate elements 6.

The second intermediate elements 6 are identical to those that form the first intermediate elements 5, and comprise a first and a second set of toothed pulleys 23 and 24 loosely mounted on a pair of spindles 25 and 26, parallel to the spindles 13 and 14 and placed there beneath, supported by the frame of the apparatus. Furthermore, the said intermediate elements 6 comprise a third and a fourth set of three toothed pulleys, 28 and 29, respectively, and these, which in a horizontal plane are staggered with respect to the pulleys 23 and 24, are loosely mounted on a pair of spindles 30 and 31 fixed to the lower extremities of the frames formed by the lever or rocker arms 19 and 20.

When the continuous conveyor 3 passes beyond the pulley 27, it winds itself alternately first of all onto the second and fourth sets of toothed pulleys 24 and 29 and then onto the third and first sets of toothed pulleys 28 and 23, after which it arrives at a transmission pulley 32 loosely mounted on a spindle supported by the frame of the apparatus and thence at the toothed powering pulley 9 so as to return to the first machine 1.

At 33 has been shown a tie rod that connects one to the other the frames formed by the lever or rocker arms 19 and 20. To be more exact, it links the upper part of the frame formed by the lever arms 19 with the lower part of the frame formed by the lever arms 20.

Up until now the main parts of the apparatus have been outlined and now a description of how the apparatus operates will be given, starting from the operating condition in which the first machine 1 and the second machine 2 are running normally and the powering pulleys 9 and 10 are carrying in motion the continuous conveyor 3 at identical movement speeds.

Should, for any reason at all, the machine 1 come to a temporary halt while the machine 2 is continuing to operate at the normal rated speed, the powering pulley 9 ceases to turn while the powering pulley 10 continues to carry in motion the continuous conveyor 3.

It thus ensues that the section of the conveyor 3 that runs between the exit point of the machine 1 and the entry point of the machine 2 is subjected to tensile stress as an effect of which the frames formed by the arms 19 and 20 tend to rotate, one clockwise and the other couterclockwise, causing the third and fourth sets of pulleys 15 and 16 of the first intermediate elements 5 to gradually approach the first set of pulleys 11 and the second set of pulleys 12, respectively, (see FIG. 3) of the said first intermediate elements 5, and making possible a gradual reduction in the overall length of the section of the continuous conveyor 3 that runs from the exit point of the first machine 1 to the entry point of the second machine 2. Contemporaneously, a gradual corresponding increase occurs in the overall length of the section of the conveyor 3 which, issuing from the machine 2, winds itself onto the pulleys 24-29 and 28-23 of the second intermediate elements 6 so as to return to the first machine 1.

This brings about a gradual decrease in the overall number of containment elements 4 constantly accommodated in the storage area 7 at the time the machines 1 and 2 are operating normally, and a consequential increase in the number of containment elements 4 constantly accommodated in the storage area 8.

Assuming now, starting from the same initial condition, that for some reason the machine 2 has come to a temporary halt while the machine 1 is continuing to operate at the normal rated speed, the powering pulley 10 ceases to turn while the powering pulley 9 continues to carry in motion the continuous conveyor 3.

In this case it is the section of the conveyor 3 that runs from the exit point of the machine 2 to the entry point of the machine 1 that is subjected to tensile stress, as an effect of which the frames formed by the arms 19 and 20 tend to rotate in the reverse direction to that mentioned previously, in such a way as to cause the third and fourth sets of pulleys 28 and 29 of the second intermediate elements 6 to gradually approach the first set of pulleys 23 and the second set of pulleys 24, respectively, of the said second intermediate elements 6. Thus a gradual increase is achieved in the overall length of the section of the conveyor 3 that winds itself onto the first intermediate elements 5, together with a corresponding gradual decrease in the overall length of the section of the conveyor 3 that winds itself onto the second intermediate elements 6.

The increase in the length of the section of the conveyor 3 that winds itself onto the first intermediate elements 5 makes it possible to raise the number of containment elements 4 normally accommodated in the storage area 7 at the time the machines 1 and 2 are operating normally, while the contemporaneous decrease in the overall length of the section of the conveyor 3 that winds itself onto the second intermediate elements 6 enables a reduction to an identical extent to be made in the number of containment elements 4 normally accommodated in the storage area 8 at the time the machines 1 and 2 are operating normally.

What has been stated above also applies in the event of the machines 1 and 2 being subjected to a temporary slow down, instead of to a temporary halt.

For the apparatus to resume the starting condition, once the machines 1 and 2 have returned to the normal conditions of operation after the above described irregular phases have been overcome, provision is made for detector devices 34 and 35 (for example, microswitches or photocells or some other equivalent devices) able to read the angular displacement value of the frames formed by the lever or rocker arms 19 and 20. In the case illustrated in FIGS. 3 and 4, the detector devices 34 and 35 are supported by the frame of the apparatus and are so placed as to read the angular displacement value of the frame formed by the arms 19 both when it rotates clockwise and when it rotates counterclockwise. The said devices 34 and 35 control the operation of other regulation devices that are not shown in the drawings, are connected, for example, to the devices that provide the first machine 1 and thus the powering pulley 9 with their drive, and are designed to cause a temporary increase in the rated speed of the first machine 1 immediately after the said machine 1 has been subjected to a temporary slowing down or halting phase, and a temporary decrease in the rated speed of the machine 1 and thus in the speed at which the powering pulley 9 is carried in motion, after a slowing down or temporary halting phase of the second machine 2. In this way, the tension of the continuous conveyor 3 between the powering pulleys 9 and 10 returns the frames formed by the lever or rocker arms 19 and 20 to the initial position. When the detector devices 34 and 35 do not come into contact with the frame formed by the lever or rocker arms 19, the said regulation devices are automatically taken out of operation, and the first and second machines, 1 and 2, respectively, resume operating at an identical rated speed and at an identical speed for carrying in motion the continuous conveyor 3.

At 36 and 37 have been shown two limit devices (see FIGS. 3 and 4) supported by the frame of the apparatus in a position in which they can be intercepted by one of the lever or rocker arms that form the frame 20 whenever a fully occupied condition of the storage areas 7 and 8 is reached. Every time such a condition exists, the limit devices 36 and 37 automatically cause the contemporaneous halting of the machines 1 and 2.

The foregoing information has naturally been given purely as an example and thus it is understood that variants of a constructional nature may be introduced. For example, the detector devices 34 and 35 can control the devices that regulate the speed of the second machine 2 or the speed of both the machines 1 and 2. The continuous conveyor 3 may also differ as also the containment elements 4 to suit the products to be transferred from the first to the second machine, without in any way deviating from the framework of protection afforded to the apparatus and as claimed hereinafter.

What is claimed is:

1. Apparatus for transferring individual or batch formed products from a first to a second machine comprising:
    at least one continuous conveyor that issues from the first machine, enters the second machine, and issuing from this returns back to the first machine; said conveyor being connected, movement wise, to powering means that are independent of one another and are connected to the first and to the second machine, respectively, in order to carry in motion said conveyor, in the normal operating condition, at the same speed as the machines themselves; said conveyor having two sections of variable length, a first placed between the exit point of the first machine and the entry point of the second machine, and a second between the exit point of the second machine and the entry point of the first machine; said sections being partially wound, with a plurality of turns, respectively, onto first and second intermediate elements, the first intermediate elements situated between the exit point of the first machine and the entry point of the second machine, and the second intermediate elements between the exit point of the second machine and the entry point of the first machine; a first part of said first and second elements being mounted on fixed spindles supported by the frame of the apparatus, and a second part of said first and second elements being mounted on movable spindles parallel to said fixed ones, supported in such a way as to be able to approach or move away from said fixed spindles to suit the tension of said conveyor due to the slowing down or the temporary halting of one of the two machines; the movable spindles of said first and second elements being interconnected so that if said second part of said first elements approaches, to a given extent, the corresponding first part, the second part of said second elements moves away from the corresponding first part, to the same extent, and vice versa.

2. Apparatus according to claim 1, wherein said continuous conveyor has connected thereto elements for containing the individual or batch formed products exiting from the first machine, said first and second intermediate elements comprising, respectively:
    a first and a second set of rotatable members loosely mounted on a pair of fixed spindles supported by the frame of the apparatus, one parallel to the other and one facing the other, the said fixed spindles being positioned in the middle part of the apparatus;
    a third and a fourth set of rotatable members loosely mounted on a pair of spindles supported by rocker arms pivotally connected to the frame of the apparatus in proximity of the first and the second machine, respectively, and placed in a horizontal plane, staggered with respect to said rotatable members of said first and second set; on issuing from the first machine, said conveyor winds itself alternately, first of all onto said rotatable members of said first and third set, and then onto said rotatable members of said fourth and second set of said first elements, after which said conveyor enters the second machine and on leaving this winds itself alternately onto said rotatable members of said second and fourth set and then onto said rotatable members of said third and first set of said second elements, and then returns to the first machine; and the rocker arms supporting said third and fourth set of rotatable members of said first and second elements being connected one to the other, so that the clockwise rotation of one corresponds an identical counter-clockwise rotation of the other.

3. Apparatus according to claim 2, comprising:

detector devices for reading the angular displacement of the arms that support the third and fourth set of rotatable members of the first and second elements, and that control the said devices for regulating the rated speed of at least one of the machines to suit the displacement detected;

limit devices so placed as to be intercepted by the said arms when they reach the maximum angular displacement position both in a clockwise and in a counterclockwise direction, and connected to the means that drive the first and second machine so as to cause them to come to a halt when they are reached by the said arms; the said detector devices being positioned in such a way as to keep or take out of operation the said regulation devices when the said arms are in a position whereby the distance between the spindles supporting the first and third set of rotatable members and between the spindles supporting the second set of rotatable members of the first and second elements is identical.

4. Apparatus according to claim 1, wherein provision is made for limit devices with which to detect the maximum displacement of the second part of the first and second intermediate elements with respect to the corresponding first part, these being wired into an electrical circuit for controlling the devices that drive the first and the second machine so as to cause the contemporaneous halting of the said machines when said second part of the first and second intermediate elements reaches the position in which it is the farthest from or the closest to the corresponding first part.

* * * * *